Aug. 12, 1952 — F. FISHER — 2,606,785

SAFETY GUARD FOR VEHICLES

Filed March 4, 1949

Inventor

Frank Fisher

By Clarence A. O'Brien and Harvey B. Jacobson

Attorneys

Patented Aug. 12, 1952

2,606,785

UNITED STATES PATENT OFFICE 2,606,785

SAFETY GUARD FOR VEHICLES

Frank Fisher, Watsonville, Calif., assignor of forty-nine per cent to W. Chester Barry, Soledad, Calif.

Application March 4, 1949, Serial No. 79,604

5 Claims. (Cl. 293—73)

This invention relates to new and useful improvements in vehicle guards and the primary object of the present invention is to provide a novel and improved bumper attachment for vehicles.

Another important object of the present invention is to provide a vehicle bumper including a horizontally swingable shock receiving bar and means for cushioning and limiting swinging movement of the bar when the same contacts an obstacle to displace force in a glancing direction.

A further object of the present invention is to provide a vehicle bumper that is extremely small and compact in structure and which is quickly and readily applied to or removed from a vehicle in a convenient manner.

A still further aim of the present invention is to provide a vehicle bumper that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1:
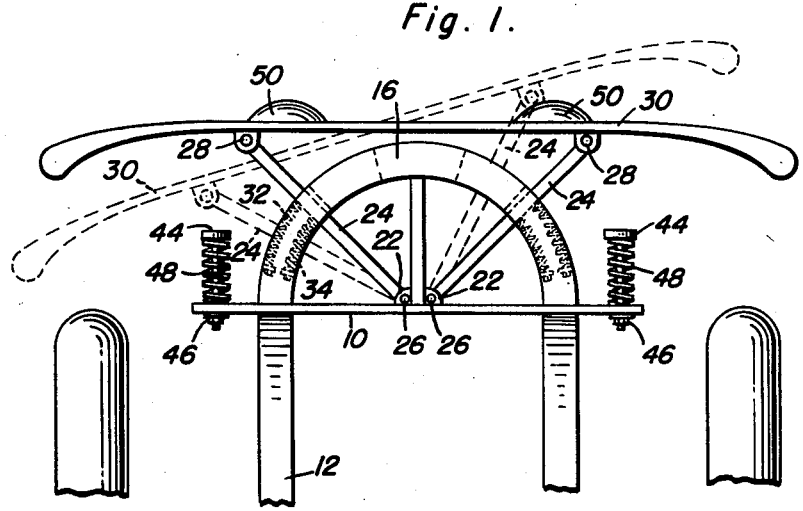
Figure 1 is a fragmentary top plan view of a vehicle and showing the present invention applied thereto and with dotted lines showing the shock receiving bar and swingable arms moved to an alternate position as a result of contact by the bar with an obstacle.
Figure 2:
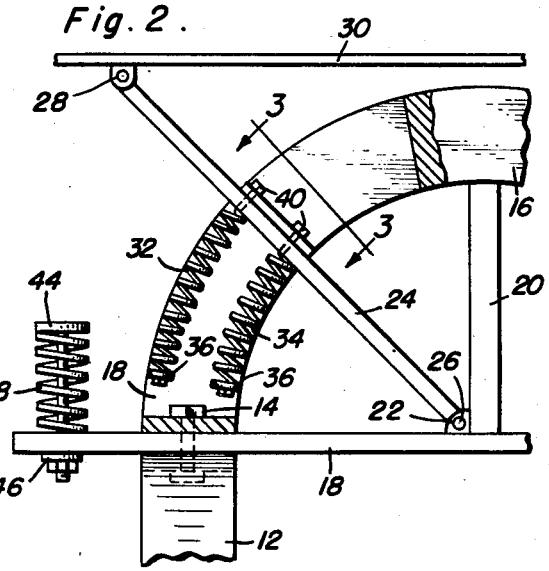
Figure 2 is an enlarged fragmentary view of Figure 1 and with parts broken away for the convenience of explanation.
Figure 3:
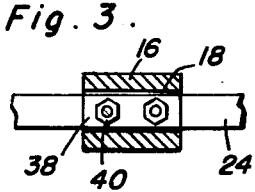
Figure 3 is an enlarged sectional view taken substantially on the plane of section line 3—3 of Figure 2; and, Figure 4 is a perspective view of the base member and guide used in conjunction with the present invention.
Figure 4:
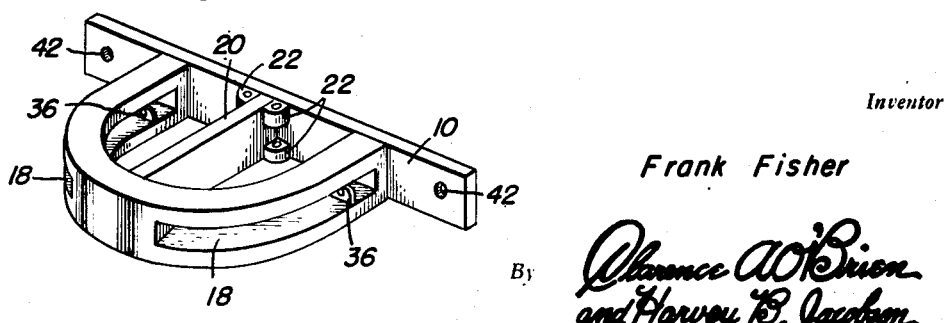

Referring now to the drawings in detail, wherein for the purpose of illustration, there is disclosed a preferred embodiment of the present invention, the numeral 10 represents an elongated base or anchor member that is removably secured, adjacent its ends, to a vehicle frame 12 by fasteners 14.

A substantially U-shaped guide 16 projects forwardly from the base member 10 and includes a pair of spaced arcuate slots or openings 18. The ends of the guide 16 are secured to the base member 10 by the fasteners 14.

Rigidly secured to and projecting laterally from the central portion of the base member 10, is a forwardly extending brace 20 that is fixed to the center of the guide 16.

Upper and lower pairs of ears 22 are secured to juncture of the brace 20 with the base member 10 and receive the inner ends of a pair of arms 24 that are secured to the ears by pivot pins or fasteners 26. The arms 24 are slidably received in the slots 18 and their outer ends are pivoted, as at 28, adjacent the end portions of an elongated shock receiving bar 30.

A pair of spring members or coil springs 32 and 34 are received in each of the slots 18. The springs 32 and 34 are spaced from each other to prevent the same from contacting and binding and the rear ends of the springs 32 and 34 are anchored to ears 36 fixed in the slots 18. The forward ends of the springs 32 and 34 extend through the arms 24 and reinforcing plates 38 on the arms 24, and are anchored in any suitable manner to the said arms, such as nuts 40 threaded on the forward ends of the springs.

It should be noted, that the springs 32 and 34 are so arranged as to retain the arms inclined relative to each other and the bar 30 spaced parallel to the base member 10 under normal conditions.

Apertures 42 are provided in the base member 10, intermediate the ends of the base member and the ends of the guide 16, and receive laterally and forwardly projecting bolts 44 that are retained relative to the base member 10 by nuts 46 threaded on the said bolts.

Coil springs 48 embrace the bolts 44 and are biased between the heads of the bolts and the base member 10 to urge the bolts forwardly.

Suitable resilient pads 50 (or cushions) are secured to the bar 30 and form a contact means and shock absorbing means when the present bumper engages an obstacle, such as a vehicle.

In practical use of the present invention, the bar 30 is normally disposed parallel to the base member 10. When the bar 30 engages an obstacle the same will swing horizontally and impart a horizontal swinging movement to the arms 24.

After the arms 24 have swung a predetermined distance, one of the said arms will engage one of the bolts 44 and the spring 48 on the bolt contacted by the bar 30 will reduce and cushion the shock.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A bumper comprising a base member, means for detachably securing the base member to a part of a vehicle, a guide carried by said base member, a pair of arms pivoted to said base member and slidably carried by said guide, a shock receiving bar pivoted directly to said arms, means forming a connection between said arms and said guide normally retaining said bar substantially parallel to said base member, and resilient cushioning means supported solely by said base member and limiting swinging movement of said arms and said bar.

2. The combination of claim 1 wherein said guide includes an arcuate member having a pair of spaced arcuate slots slidably receiving said arms.

3. The combination of claim 1 wherein said means normally retaining said bar substantially parallel to said base member includes a plurality of spring members having first end portions anchored to said guide and second end portions anchored to said arms.

4. A bumper attachment for vehicles comprising an elongated base member, means detachably securing said base member to a part of a vehicle, a substantially U-shaped guide having its ends secured to said base member, said guide having a pair of spaced arcuate slots, a pair of arms slidably received in said slots, means pivotally securing said arms to said base member, a shock receiving bar pivoted to said arms, springs mounted in said slots and secured to said arms for holding the bar parallel to the base member, and resilient cushioning members carried by said base member for limiting pivotal movement of said arms.

5. A bumper attachment for vehicles comprising an elongated base member, means detachably securing said base member to a part of a vehicle, a substantially U-shaped guide having its ends secured to said base member, said guide having a pair of spaced arcuate slots, each of said slots including an edge disposed relatively close to the base member and another edge disposed remotely from the base member, a pair of arms slidably received in said slots, means pivotally securing said arms to said base member, a shock receiving bar pivoted directly to said arms, springs mounted in said slots and terminally secured to the walls of said slots and to said arms for holding the bar parallel to the base member, said arms being normally retained medially between the said edges of said slots, and cushioning means carried by the base member and disposed in the path of swinging movement of said arms for limiting pivotal movement of said arms.

FRANK FISHER.

REFERENCES CITED

The following references are of record in the file of this patent:

UNITED STATES PATENTS

| Number | Name | Date |
| --- | --- | --- |
| 524,175 | Kidd | Aug. 7, 1894 |
| 690,674 | Surtin | Jan. 7, 1902 |
| 718,888 | Taylor | Jan. 20, 1903 |
| 1,114,936 | Sylvester | Oct. 27, 1914 |
| 1,715,577 | Sylvester et al. | June 4, 1929 |
| 1,810,502 | Thomas | June 16, 1931 |
| 2,137,914 | King | Nov. 22, 1938 |

FOREIGN PATENTS

| Number | Country | Date |
| --- | --- | --- |
| 193,892 | Great Britain | Mar. 1, 1923 |